(12) United States Patent
Onishi

(10) Patent No.: US 8,797,618 B2
(45) Date of Patent: Aug. 5, 2014

(54) IMAGE PROCESSING APPARATUS FOR DETERMINING WHETHER A DOCUMENT IS COLOR OR MONOCHROME

(75) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/763,151

(22) Filed: Apr. 19, 2010

(65) Prior Publication Data

US 2010/0296115 A1    Nov. 25, 2010

(30) Foreign Application Priority Data

May 20, 2009 (JP) ................................ 2009-122559

(51) Int. Cl.
*H04N 1/60* (2006.01)
(52) U.S. Cl.
USPC ............. 358/539; 358/1.9; 358/2.1; 358/501; 382/190; 382/192
(58) Field of Classification Search
None
See application file for complete search history.

(56) References Cited

U.S. PATENT DOCUMENTS

| | | | | |
|---|---|---|---|---|
| 5,237,379 A | * | 8/1993 | Sklut et al. | ........................ 399/86 |
| 5,282,026 A | * | 1/1994 | Nagata | .......................... 358/500 |
| 5,724,441 A | * | 3/1998 | Yoshida | .......................... 382/166 |
| 5,738,457 A | * | 4/1998 | Ishida et al. | ................... 400/706 |
| 5,875,033 A | * | 2/1999 | Kawata et al. | ................. 358/296 |
| 7,061,647 B2 | | 6/2006 | Matsuya | .......................... 358/1.9 |
| 7,548,344 B2 | | 6/2009 | Matsuya | .......................... 358/1.9 |
| 2004/0057763 A1 | * | 3/2004 | Kawai et al. | ................... 399/367 |
| 2006/0238781 A1 | * | 10/2006 | Fukao | ........................... 358/1.39 |
| 2008/0239354 A1 | * | 10/2008 | Usui | ............................... 358/1.9 |

FOREIGN PATENT DOCUMENTS

JP    2002-199239    7/2002

* cited by examiner

*Primary Examiner* — Benny Q Tieu
*Assistant Examiner* — Michael Y Tzeng
(74) *Attorney, Agent, or Firm* — Fitzpatrick, Cella, Harper & Scinto

(57) ABSTRACT

Provided is an image processing apparatus that improves the accuracy in ACS determination without needing a mechanism to detect an original document size, a user input of an original document size, or pre-scanning of an original document, and a control method therefor. To accomplish this, the image processing apparatus specifies, when reading an original document, the size of the original document, based on the timings at which the leading edge and the trailing edge of the original document that is conveyed were detected. Furthermore, the image processing apparatus determines whether image data read from the original document is a color image or a monochrome image, for each size of a plurality of standard-size printing medium, and selects, from among the determination results, a determination result obtained by performing determination using the standard-size printing medium size that is similar to the specified size of the original document.

7 Claims, 10 Drawing Sheets

IMAGE PROCESSING APPARATUS FOR DETERMINING WHETHER A DOCUMENT IS COLOR OR MONOCHROME

BACKGROUND OF THE INVENTION

1. Field of the Invention

The present invention relates to an image processing apparatus that determines whether a reading target original document is color or monochrome, a control method therefor, and a program.

2. Description of the Related Art

In an image processing apparatus using a color laser beam printer, it is desirable to execute copying using only black with respect to a monochrome original document, in consideration of the life of a drum and the amount of toner consumption. Accordingly, image processing apparatus are provided with the ACS (Auto Color Select) function for identifying whether an original document image is a color original document or a monochrome original document.

In such an image processing apparatus, when performing ACS determination on an original document read by an ADF (automatic document feeder), if ACS determination is performed with respect to a range wider than the width of the original document, there are cases where incorrect determination is performed. For example, there are cases where if color misalignment exists in the end portion of the original document, it is incorrectly determined that the original document is a color original document although the read original document is a monochrome original document.

In view of this, in order to correctly determine whether the original document that is read is a color original document or a monochrome original document, a technique has been proposed in which the width of the original document is specified using an original document width detection guide, a width narrower than the specified width of the original document is decided to be used as an ACS determination area, and then ACS determination is performed. Further, Japanese Patent Laid-Open No. 2002-199239 proposes a technique in which, in order to improve the original document reading position accuracy in ACS determination, a threshold value for determining a group of pixels to be color pixels in an original document that has been read is changed for each apparatus.

However, the above conventional techniques have the following problems. In order to accurately determine whether an original document is a color original document or a monochrome original document, it is desirable to make the above determination area used for ACS determination as large as possible, in the range where color misalignment in the end portion of the original document is not incorrectly detected. However, when attempting to make the ACS determination area as large as possible according to the size of the original document, it is necessary to provide a mechanism to detect the original document size, such as a guide that detects the width of the original document, in order to specify the original document size. If such a mechanism is mounted in an apparatus, the guide is necessary, thus increasing the size of the apparatus, and resulting in an increase in cost.

Further, in order to specify the original document size, although it is conceivable to have a user input the size of the original document in advance, this places a burden on the user. Also, in another case, the original document is scanned once in order to specify the size of an original document, and thereafter scanned again so as to read the image thereon, and although the accuracy improves in this case, there is the problem that productivity falls.

SUMMARY OF THE INVENTION

The present invention enables realization of an image processing apparatus that improves the accuracy in ACS determination without needing a mechanism to detect the original document size, a user input of the original document size, or pre-scanning of an original document, and a control method therefor.

One aspect of the present invention provides an image processing apparatus provided with a conveying unit that conveys an original document, and a reading unit that reads the original document that is conveyed, the image processing apparatus comprising: a detection unit that detects a leading edge and a trailing edge of the original document that is conveyed; a specification unit that specifies a size of the original document, based on timings at which the detection unit detected the leading edge and the trailing edge; a determination unit that determines whether image data read by the reading unit is a color image or a monochrome image, for each size of a plurality of standard-size printing medium; and a selection unit that selects, from among a plurality of determination results obtained by the determination unit, a determination result obtained by performing determination using a size of the standard-size printing medium similar to the size of the original document specified by the specification unit.

Another aspect of the present invention provides a control method for an image processing apparatus provided with a conveying unit that conveys an original document, and a reading unit that reads the original document that is conveyed, the method comprising: a detection unit detecting a leading edge and a trailing edge of the original document that is conveyed; a specification unit specifying a size of the original document, based on timings at which the leading edge and the trailing edge were detected in the detection; a determination unit determining whether image data read by the reading unit is a color image or a monochrome image, for each size of a plurality of standard-size printing medium; and a selection unit selecting, from among a plurality of determination results obtained in the determination, a determination result obtained by performing determination using a size of the standard-size printing medium similar to the size of the original document specified in the specification.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Processing Apparatus

Figure 1:
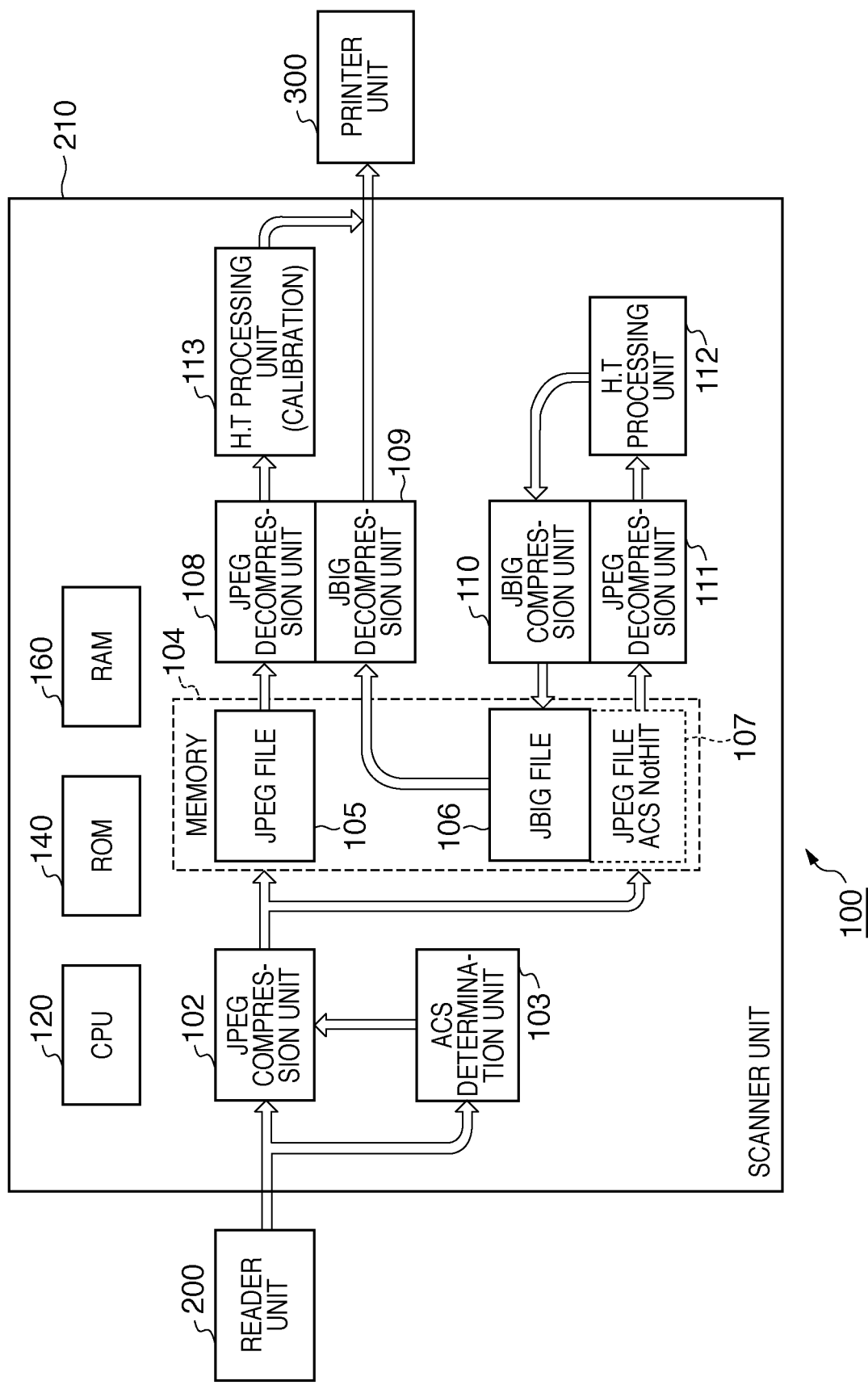
FIG. 1 is a block diagram showing an example of a configuration of an image processing apparatus according to an embodiment of the present invention.

First, the configuration of an image processing apparatus according to the present embodiment is described with reference to FIG. 1. FIG. 1 is a block diagram showing an example of the configuration of the image processing apparatus according to the present embodiment. Here, a copying apparatus 100 is described as an example of the image processing apparatus according to the present embodiment.

The copying apparatus 100 is provided with an operation unit 150, a reader unit 200, a scanner unit 210, and a printer unit 300. The operation unit is provided with a start button (see FIG. 5) for starting an original document reading operation, and pressing the start button starts copying processing. The copying apparatus 100 reads an original document using the reader unit 200 serving as a reading unit. An image of the original document read by the reader unit 200 is transmitted to the printer unit 300 via various image processing blocks included in the scanner unit 210. The printer unit 300 prints the image transmitted from the scanner unit 210. Here, an example is described in which the reader unit 200 is provided with a reading sensor whose effective reading width is 216 mm. This is substantially the same as the length of the shorter side of letter-size printing medium.

The scanner unit 210 is provided with a JPEG compression unit 102, an ACS determination unit 103, a memory 104, and JPEG decompression units 108 and 111. Further, the scanner unit 210 is provided with a JBIG compression unit 110, a JBIG decompression unit 109, H.T processing units 112 and 113, a CPU 120, a ROM 140, and a RAM 160. The CPU 120 performs overall control of the copying apparatus 100. The ROM 140 stores various programs read out by the CPU 120. The RAM 160 functions as a work memory for the CPU 120, and stores various variables and parameters.

Next is a description of a data flow until when an image read by the reader unit 200 is transferred to the printer unit 300. First, the image of the original document read by the reader unit 200 is transmitted to the JPEG compression unit 102 and the ACS determination unit 103 as image data. The JPEG compression unit 102 compresses the image data (bitmap format image data) of the received original document into JPEG format image data. On the other hand, the ACS determination unit 103 determines whether or not color data is included in the image data of the received original document, generates a monochrome judgment flag (referred to as ACSNotHIT, here) depending on the determination result, and delivers the monochrome judgment flag to the JPEG compression unit 102. As described above, the ACS determination unit 103 determines whether or not color data is included in an area that has a slightly narrower width than the actual original document width (Letter: 8.5*11 inches (approximately 216*approximately 279 mm), A4: 210*297 mm, B5: 182*257 mm).

Next, the compressed JPEG format image data and the ACS determination result (monochrome judgment flag (ACSNotHIT)) are transmitted from the JPEG compression unit 102 to the memory 104. The memory 104 stores the image data transmitted from the JPEG compression unit 102 as a JPEG file 105. If an instruction to execute copying has been given, the CPU 120 performs reconstruction on the JPEG file 105 stored in the memory 104 using the JPEG decompression unit 108. After that, the CPU 120 performs tone correction on the reconstructed image data using the H.T processing (halftone processing) unit 113, and thereafter transmits the resultant data to the printer unit 300.

On the other hand, if the image data that is stored in the memory 104 is a monochrome image, the image data is once stored in the memory 104 as a JPEG file 107. After that, the CPU 120 reconstructs the original image data of the JPEG file 107 using the JPEG decompression unit 111. Then, the H.T processing (halftone processing) unit 112 performs tone correction on the reconstructed image data, and thereafter the JBIG compression unit 110 compresses the resultant data into JBIG format image data, and the compressed data is stored in the memory 104 as a JBIG file 106. After that, if an output instruction is received from a user, the CPU 120 reads out the JBIG file 106 from the memory 104, and decompresses the JBIG file 106 to obtain the original image data using the JBIG decompression unit 109, and thereafter transmits the obtained data to the printer unit 300, and prints it. In this way, the capacity of the memory can be efficiently used by converting JPEG image data into JBIG image data, and holding JBIG image data. This will be later described in detail with reference to FIG. 9.

Further, the JPEG decompression unit 108 shown in FIG. 1 reconstructs, by decompressing JPEG compression image data, the original image from the compressed image. At this time, the monochrome judgment flag (ACSNotHIT) corresponding to JPEG compression image data is utilized.

If developing materials are, for example, magenta (M), cyan (C), yellow (Y), and black (BK), a color space conversion circuit performs color space conversion on the reconstructed image data from RGB color space to the above color space, thus obtaining M, C, and Y signals. Furthermore, a BK signal is generated in a UCR processing circuit. Color correction is further performed in a masking correction circuit.

Here, for example, if the monochrome judgment flag (ACSNotHIT) has been hit, that is, if it is determined that the original document image is a monochrome image, only a BK signal is generated as an image signal. On the other hand, if the monochrome judgment flag (ACSNotHIT) has not been hit, that is, if it is determined that the original document image is a color image, M, C, Y, and BK signals are generated as image signals. Then, the H.T processing unit 113 performs tone correction on the obtained M, C, Y, and BK color data pieces, and transmits the resultant data to the printer unit 300.

The printer unit 300 performs development using the obtained image data, and then performs printing. Here, it is also possible to utilize the monochrome judgment flag (ACSNotHIT). For example, if the monochrome judgment flag (ACSNotHIT) has been hit, the printer unit 300 performs monochrome printing using only the BK developing material. On the other hand, if the monochrome judgment flag (ACSNotHIT) has not been hit, the printer unit 300 performs color printing using the M, C, Y, and BK developing materials. In this way, in the copying apparatus 100, a configuration is devised in which productivity is increased at the time of performing printing and pre-processing for the printing by utilizing the result of color image/monochrome image determination made by the ACS determination unit 103.

The ACS determination unit 103 automatically judges, for each page, whether the original document on an original document platen of the reader unit 200 is a color original document or a monochrome original document from the scanned color image data. For example, if it is judged that the original document is a monochrome original document, the monochrome judgment flag (ACSNotHIT) is added to JPEG compression data. On the other hand, if it is judged that the original document is a color original document, the monochrome judgment flag (ACSNotHIT) is not added to JPEG compression data. Here, although an example is described in which the monochrome judgment flag (ACSNotHIT) is added to JPEG compression data if it is judged that the original document is a monochrome original document, and the flag is not added if it is judged that the original document is a color original document, there is no limitation to this. If it is judged that the original document is a color original document, a different color judgment flag may be added to JPEG compression data. Further, a color judgment flag may be added to JPEG compression data if it is judged that the original document is a color original document, and the color judgment flag may not be added if it is judged that the original document is a monochrome original document.

Figure 2:
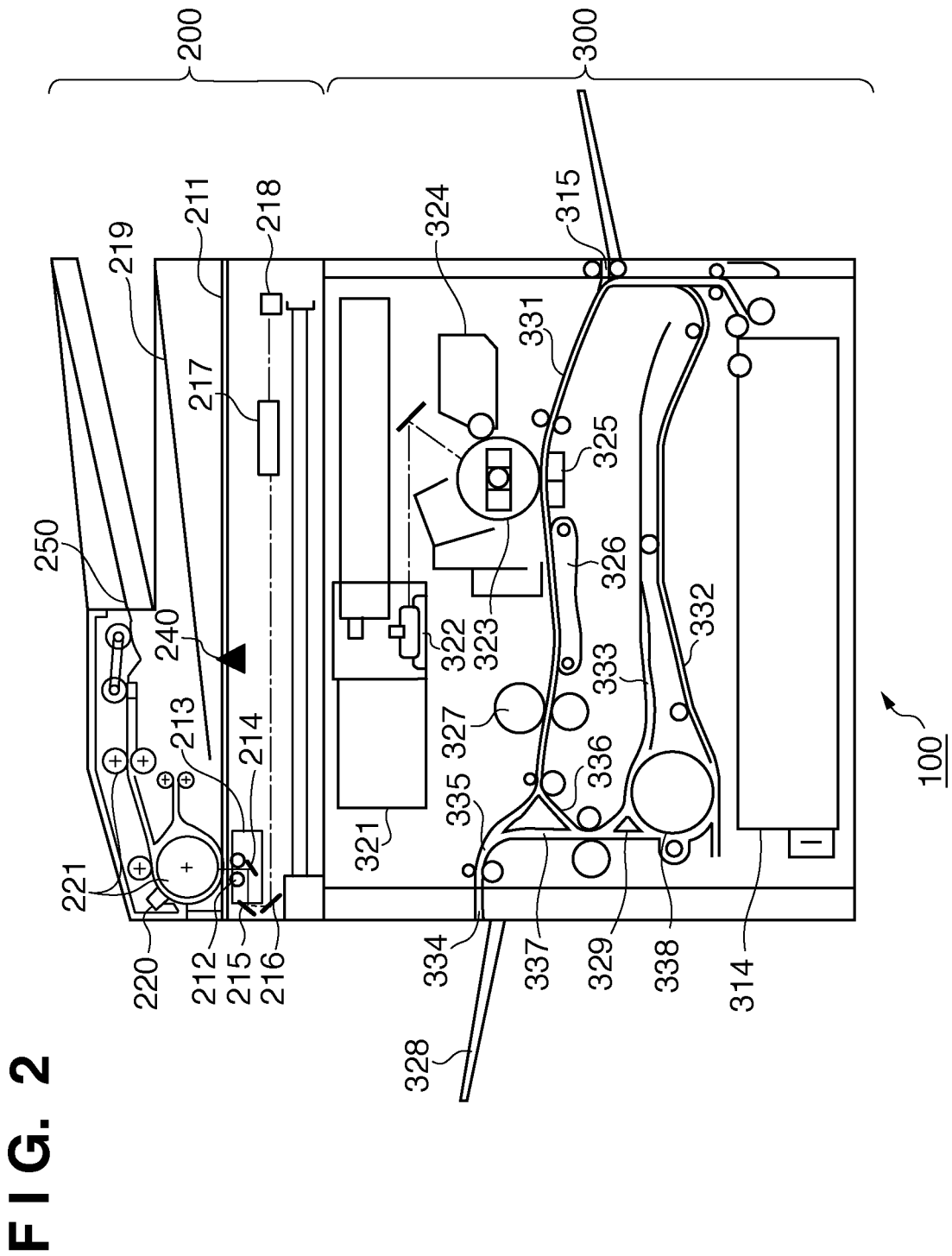
FIG. 2 is a cross-sectional view showing an example of a configuration of a reader unit 200 and a printer unit 300 according to the embodiment of the present invention.

Next, the reader unit 200 and the printer unit 300 of the copying apparatus 100 are described with reference to FIG. 2. FIG. 2 is a cross-sectional view showing an example of a configuration of the reader unit 200 and the printer unit 300 according to the present embodiment.

In the reader unit 200, original document printing medium stacked on an automatic document feeder unit 250 (hereinafter, referred to as an ADF unit) is sequentially supplied onto a platen glass 211 sheet by sheet, starting from the top of the stacked media and moving downward. After that, an image of the original document printing medium is read on the platen glass 211, and the printing medium is discharged into a discharge tray 219.

A conveying path that guides an original document is provided with a conveyance roller 221 that is driven by a stepping motor 223 described later, and an original document detection sensor 220 that detects the leading edge and the trailing edge of an original document based on the control of a sensor control unit 222 described later.

The original document printing medium stacked on the ADF unit 250 passes over an original document flow reading position 240 at a constant speed due to the conveyance roller 221 driven by the stepping motor 223. In this case, an optical unit 213 moves to the original document flow reading position 240, and irradiates the original document conveyed at a uniform speed with a lamp 212. The reflected light from the original document printing medium is guided to a CCD image sensor (hereinafter, referred to as "CCD") 218 via mirrors 214, 215, and 216, and a lens 217. Thereby, the scanned original document image is read by the CCD 218. Image data is generated by the CCD 218 reading a scanned image as needed, and the image data is transferred to the scanner unit 210.

In the printer unit 300, a laser beam corresponding to the image data outputted from the scanner unit 210 is emitted from a laser emitting unit 322 that is driven by a laser driver 321. Thereby, an electrostatic latent image that is in accordance with the laser beam is formed on a photosensitive drum 323, and a developing device 324 causes developing materials to adhere to the electrostatic latent image portion. Thereby, the electrostatic latent image is developed.

At a timing synchronized with the start of irradiation with the laser beam, a recording sheet is fed from any one of cassettes 311, 312, 313, and 314, and a manual feed stage 315. The recording sheet is conveyed to a transfer unit 325 via a conveying path 331, and developing materials that have adhered to the photosensitive drum 323 are transferred to the recording sheet. The recording sheet on which image data has been transferred is conveyed to a fixing unit 327 by a conveyance belt 326, and the image data is fixed through heating/pressing processing.

The recording sheet that passed through the fixing unit 327 passes along conveying paths 335 and 334, and is discharged to a discharge bin 328. Further, in the case where the printing surface is reversed and discharged to the discharge bin 328, the recording sheet is guided to conveying paths 336 and 338, is conveyed in an opposite direction therefrom, passes along a conveying path 337 and the conveying path 334, and is discharged to the discharge bin 328. Note that a discharge unit may be mounted instead of the discharge bin. The discharge unit can sort the discharged recording sheets by bundling them, and perform stapling processing for stapling the sorted recording sheets, for instance.

Further, in the case where image data is recorded on both sides of a recording sheet, the recording sheet is, after having passed through the fixing unit 327, guided by a flapper 329 from a conveying path 336 to a conveying path 333. After that, the recording sheet is conveyed in an opposite direction, and is guided to a conveying path 338 by the flapper 329, and then to a re-feeding conveying path 332. The recording sheet guided to the re-feeding conveying path 332 passes along the conveying path 331 in a manner similar to that described above, and is fed to the transfer unit 325.

Specification of Original Document Size

Figure 3:
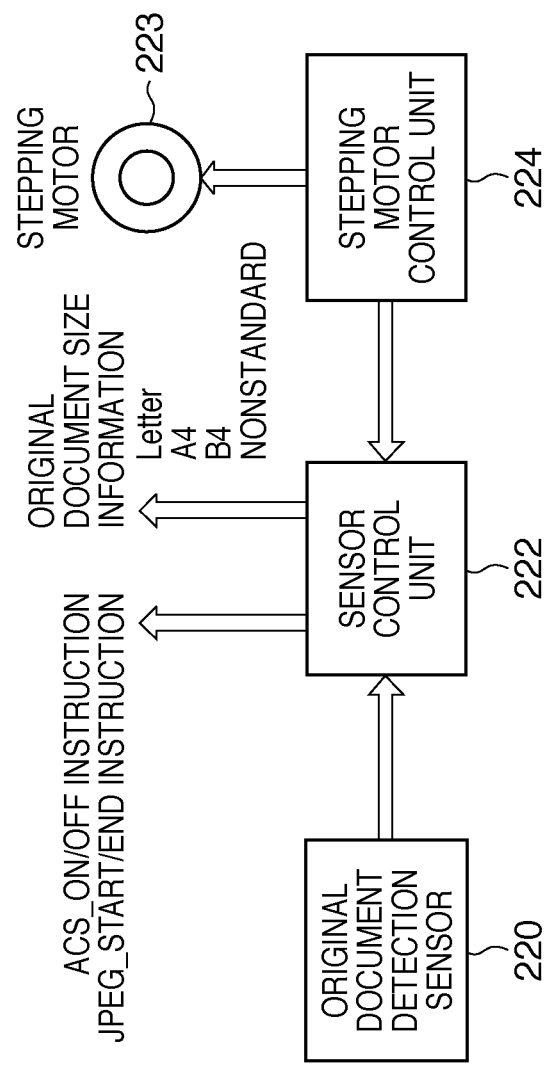
FIG. 3 is a block diagram showing an example of a configuration for specifying an original document size according to the embodiment of the present invention.

Next, a method for specifying an original document size is described with reference to FIG. 3. FIG. 3 is a block diagram showing an example of a configuration for specifying an original document size according to the present embodiment. The original document detection sensor 220 detects the leading edge and the trailing edge of an original document that has been fed, and notifies the sensor control unit 222 of the detection. Note that the original document detection sensor 220 is desirably an inexpensive sensor that physically rotates. Reference numeral 224 denotes a stepping motor control unit that controls the stepping motor 223. The stepping motor control unit 224, by controlling the stepping motor 223, drives the conveyance roller 221, and conveys an original document at a constant speed.

The original document detection sensor 220 detects the leading edge of the conveyed original document, and notifies the sensor control unit 222 that the leading edge of the original document has been detected. After that, the sensor control unit 222 transmits, to the scanner unit 210, an ACS_ON instruction for causing the ACS determination unit 103 to start ACS determination, and a JPEG START instruction for causing the JPEG compression unit 102 to start JPEG compression. As described above, the ACS determination unit 103 determines whether or not color data is included in an area that has a slightly narrower width than the actual original document width (Letter: 8.5*11 inches (approximately 216*approximately 279 mm), A4: 210*297 mm, B5: 182*257 mm).

Furthermore, the original document detection sensor 220 detects the trailing edge of the original document that is conveyed at a constant speed, and notifies the sensor control unit 222 that the trailing edge of the original document has been detected. After that, the sensor control unit 222 transmits, to the scanner unit 210, an ACS_OFF instruction for ending ACS determination, and a JPEG_END instruction for ending JPEG compression.

The sensor control unit 222 calculates the length in the conveying direction of the original document that is being conveyed based on original document conveying speed information obtained by the stepping motor control unit 224, and the detection timings at which the original document detection sensor 220 detected the leading edge and the trailing edge of the original document. Furthermore, the sensor control unit 222 specifies the original document size of the original document that is being conveyed by checking the calculated length in the conveying direction against the standard sizes assumed in advance. The standard sizes assumed in advance are the lengths in the conveying direction of the standard sizes, such as Letter (8.5*11 inches (approximately 216*approximately 279 mm)), A4 (210*297 mm), and B5 (182*257 mm), for example. Then, the sensor control unit 222 notifies the scanner unit 210 of the specified original document size information. In this way, the copying apparatus 100 according to the present embodiment can specify the original document size of the original document placed on the ADF unit 250 without providing the ADF unit 250 with an expensive original document width detection sensor.

Figure 4:
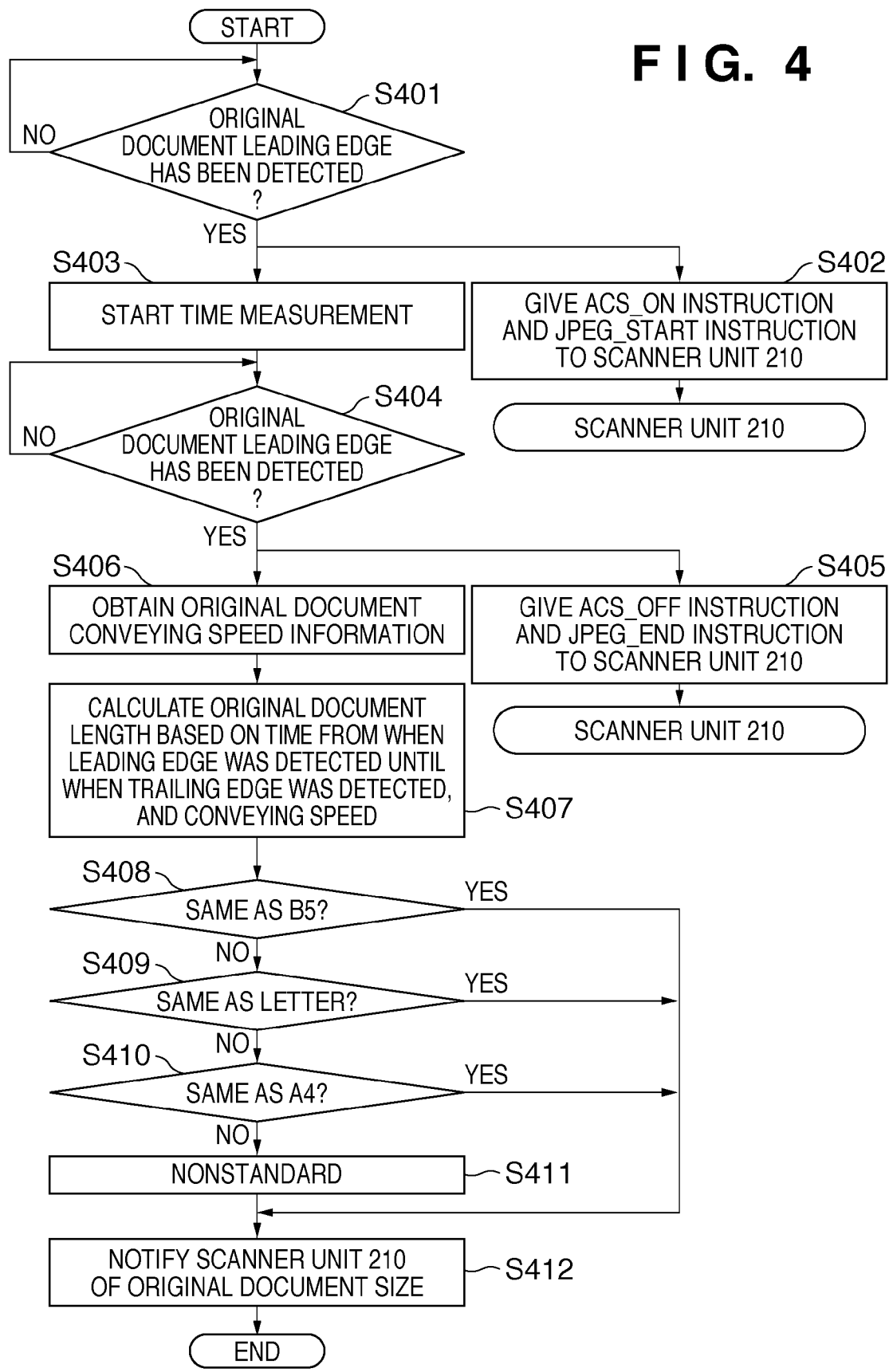
FIG. 4 is a flowchart showing a control procedure used when specifying the original document size according to the embodiment of the present invention.

Next, detailed control for specifying an original document size is described with reference to FIG. 4. FIG. 4 is a flowchart showing a control procedure used when specifying an original document size according to the present embodiment. The processing described below is mainly controlled by the sensor control unit 222.

First, in S401, the sensor control unit 222 determines whether or not the leading edge of an original document has been detected by the original document detection sensor 220. Here, if an output signal indicating that the leading edge of the original document has been detected is received from the original document detection sensor 220, the sensor control unit 222 proceeds to the processing of S402 and S403, and if such a signal has not been received, the sensor control unit 222 repeats the determination in S401 periodically until the output signal is received.

In S402, the sensor control unit 222 gives the ACS_ON instruction and the JPEG_START instruction to the scanner unit 210, and furthermore starts time measurement in S403 in parallel. Subsequently, in S404, the sensor control unit 222 determines whether or not the trailing edge of the original document has been detected by the original document detection sensor 220. Here, if an output signal indicating that the trailing edge of the original document has been detected is received from the original document detection sensor 220, the sensor control unit 222 proceeds to the processing of S405 and S406, and if such a signal has not been received, the sensor control unit 222 repeats the determination in S404 periodically until the output signal is received.

In S405, the sensor control unit 222 gives the ACS_OFF instruction and the JPEG_END instruction to the scanner unit 210, and furthermore in S406 in parallel, obtains information on the original document conveying speed from the stepping motor control unit 224. Subsequently, in S407, the sensor control unit 222 calculates the length in the conveying direction of the original document based on the time from when the original document detection sensor 220 detected the leading edge until when it detected the trailing edge, and the conveying speed.

Next, in S408 to S410, the sensor control unit 222 compares the calculated length in the conveying direction of the original document with the lengths in the conveying direction of the standard-size printing medium sizes. Then, the sensor control unit 222 determines whether or not there is a standard-size printing medium that has the same length in the conveying direction as the calculated length among the standard-size printing medium, and specifies the size of the original document. In FIG. 4, although B5, Letter, and A4 are used as examples of standard-size printing medium sizes, the sizes are not limited to these, and a comparison may be made with various other standard-size printing medium sizes. Here, if it is determined that there is no standard-size printing medium that has the same length among the B5, Letter, and A4 sizes, in S411, the sensor control unit 222 specifies the size of the original document as being a nonstandard size. Upon specifying the size of the original document, in S412, the sensor control unit 222 notifies the scanner unit 210 of information on the specified original document size, and ends the processing.

Here, since the effective reading width of the reader unit 200 is set to 216 mm, the sizes of the standard-size printing medium that can be specified by determining the length in the sub scanning direction without determining the length in the main scanning direction are B5, Letter, and A4, and thus the above example has been described. In addition to this, in the case of an A5 size original document, it is possible to determine, by setting the longer side of the A5 original document in the main scanning direction, that the original document is an A5 size original document based, in the same manner, only on the length in the sub scanning direction, without determining the length in the main scanning direction. However, if the shorter side of the A5 original document is set in the main scanning direction, the length in the main scanning direction is not determined, and accordingly it is determined that the size of the original document is a nonstandard size. Here, although a description has been given regarding the example in which the sensor control unit 222 performs the processing shown in FIG. 4, there is no limitation to this. A configuration may be adopted in which the CPU 120 performs the processing shown in FIG. 4 in accordance with the program stored in the ROM 140.

Operation Unit

Figure 5:
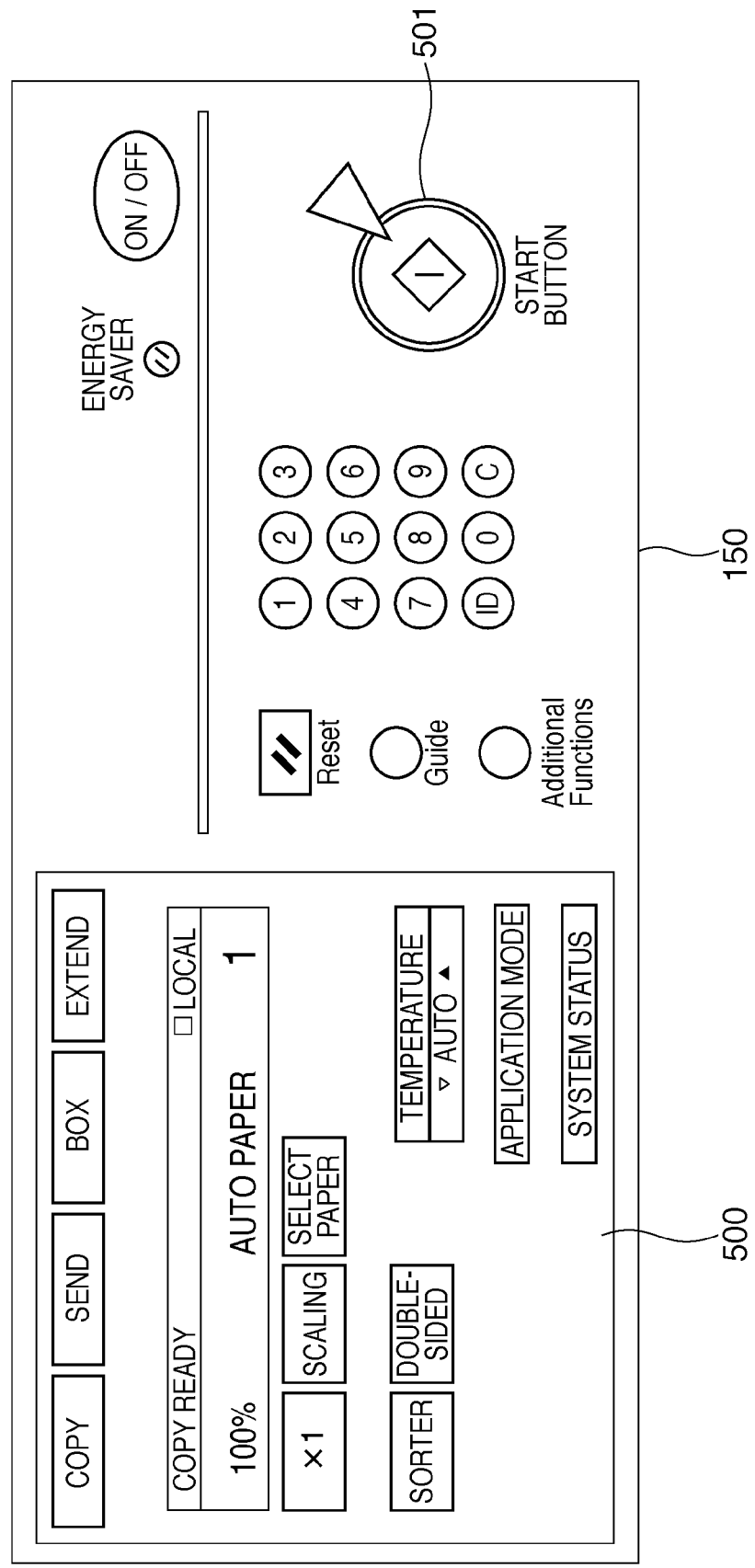
FIG. 5 is a diagram showing an operation unit 150 of a copying apparatus 100 according to the embodiment of the present invention.

Next, the configuration of the operation unit 150 of the copying apparatus 100 is described with reference to FIG. 5. FIG. 5 is a diagram showing the operation unit 150 of the copying apparatus 100 according to the present embodiment. As shown in FIG. 5, the operation unit 150 is provided with a user interface 500 and various hard keys. The user interface 500 is, for example, a touch-panel liquid crystal display, with which various copy modes (for example, a double-sided print setting, grouping, sorting, stapling output, etc.) can be set. Note that such a copy mode may be set using a hard key or a soft key displayed on the touch panel. A button 501 is a start button, and pressing the button triggers the start of copying processing.

When copying is started, the scanner is started based on the control of the CPU 120 that controls the entire system, thus starting reading of the original document on the original document platen. After that, as described above, the original document is read by the CCD 218 for reading a color image, and the image data that has been read is transmitted from the reader unit 200 to the scanner unit 210.

ACS Determination Unit

Figure 6:
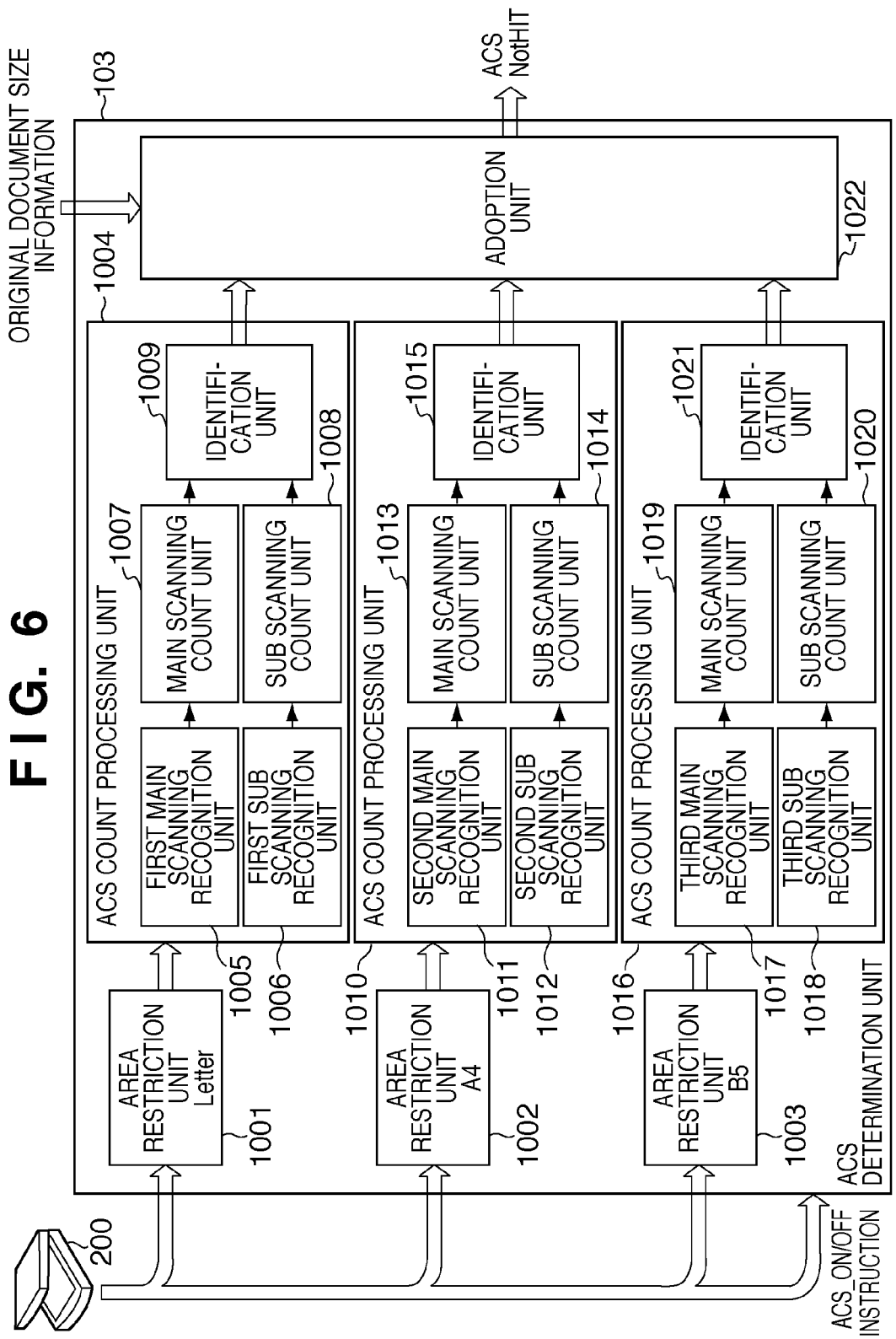
FIG. 6 is a block diagram showing an example of a configuration of an ACS determination unit according to the embodiment of the present invention.

Next, the ACS determination unit 103 is described with reference to FIG. 6. FIG. 6 is a block diagram showing an example of a configuration of the ACS determination unit according to the present embodiment. The ACS determination unit 103 is controlled in response to the ACS_ON/OFF instruction received from the reader unit 200. A configuration is adopted in which area restriction units 1001, 1002, and 1003 and ACS count processing units 1004, 1010, and 1016 operate in parallel in response to the ACS_ON instruction received from the reader unit 200.

The area restriction units 1001, 1002, and 1003 hold the original document widths in the main scanning direction, and the original document lengths in the sub scanning direction of the standard-size printing medium sizes respectively determined in advance, as parameters used as area restriction coefficients, and restricts effective data that is a determination target in image data that is read. Here, the original document width in the main scanning direction indicates the length in the orthogonal direction with respect to the original document conveying direction in the copying apparatus 100. The effective reading width of the reader unit 200 is substantially the same as 216 mm, which is the length in the shorter side direction of the letter size. Further, the original document length in the sub scanning direction indicates the length in the original document conveying direction in the copying apparatus 100. Further, a determination target indicates data of interest used for determining whether the read image data is a color image or a monochrome image. In the present embodiment, the area restriction units respectively hold areas that are slightly smaller than the original document sizes, such as Letter, A4, and B5, as area restriction coefficients, for example. The area restriction coefficients held by the area restriction units 1001, 1002, and 1003 respectively corresponded to the Letter size (approximately 216*approximately 279 mm), A4 size (210*297 mm), and B5 size (182*257 mm) original documents. For example, area restriction coefficients of approximately 214*approximately 277 mm, 208*295 mm, and 180*255 mm are respectively set for the Letter size (approximately 216*approximately 279 mm), the A4 size (210*297 mm), and the B5 size (182*257 mm). Here, although the area restriction coefficients are set to areas smaller than the original document sizes by 2 mm, there is no limitation to this. It is sufficient that, in order to prevent incorrect determination due to an original document end portion, the area restriction coefficients secure necessary areas.

Figure 7:
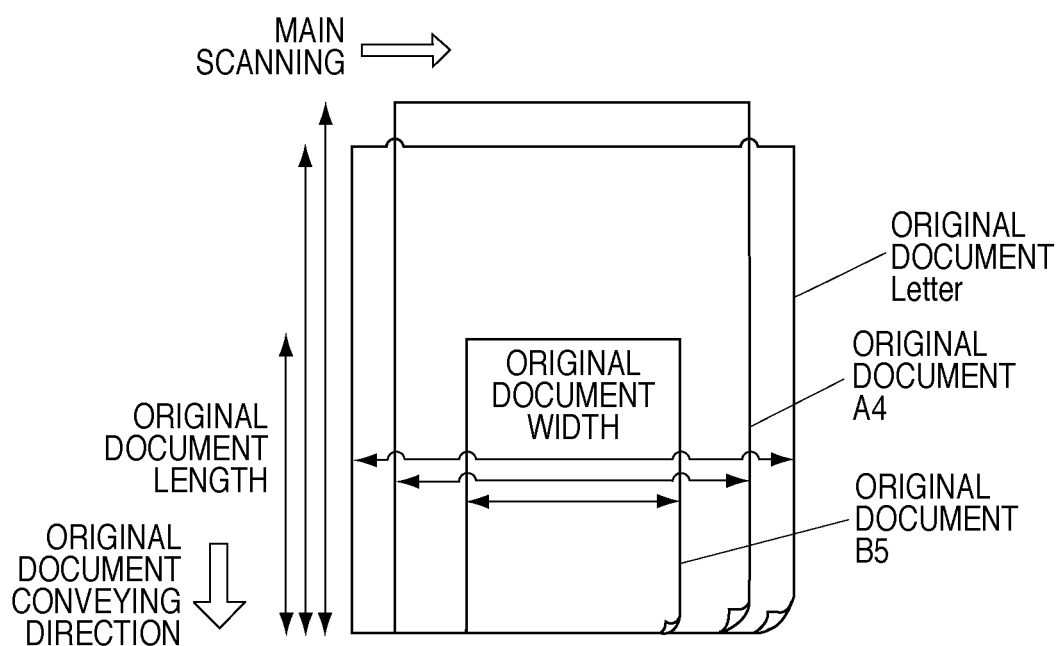
FIG. 7 is a diagram showing the differences between parameters for a main scanning direction and a sub scanning direction of standard-size printing medium.

FIG. 7 is a diagram showing the differences between parameters for the main scanning direction and the sub scanning direction of the standard-size printing medium. In the present embodiment, as shown in FIG. 7, the parameters of the standard-size printing medium are held as area restriction coefficients, and thus the areas used for ACS determination are restricted. The above area restriction coefficients are applied to count a video clock in synchronization with one pixel, a horizontal synchronization signal with which a main scanning line can be recognized, and a sub scanning synchronization signal that are obtained by the reader unit 200, for example. Thereby, the restricted areas for the ACS determination are provided.

Returning back to the description of FIG. 6, the ACS count processing unit 1004 is described next. The ACS count processing unit 1004 is provided with a first main scanning recognition unit 1005, a first sub scanning recognition unit 1006, a main scanning count unit 1007, a sub scanning count unit 1008, and an identification unit 1009. The first main scanning recognition unit 1005 determines whether or not the number of groups of chromatic color pixels that are continuous in the main scanning direction is greater than or equal to a predetermined number, in the restricted area. After that, the first main scanning recognition unit 1005 transmits the determination result downstream to the main scanning count unit 1007. The main scanning count unit 1007 counts up each time a group of chromatic color pixels that has a set continuity has been detected in one main scanning line for a predetermined number of times, and it has been confirmed that color exists in the line of interest. This completes determination processing for the main scanning direction.

Next, determination processing for the sub scanning direction is described. A feature of determination processing for the sub scanning direction is that if a group of color pixels has been recognized in a line of interest, color existence in the sub scanning direction is recognized by observing the continuity of the group of color pixels in the sub scanning direction. The first sub scanning recognition unit 1006 has the same configuration as that of the first main scanning recognition unit 1005, and a parameter for the continuity to be compared can be set to a different value. The sub scanning count unit 1008 counts up each time the continuity in the sub scanning direction is recognized in the same way as with the main scanning direction.

The identification unit 1009 determines whether an original document is color or monochrome based on a predetermined determination condition, and the output from the main scanning count unit 1007 and the sub scanning count unit 1008 in the area restricted by the area restriction unit 1001. For example, the identification unit 1009 determines that the original document is color or monochrome if the counted value is a value greater than or equal to a predetermined threshold value.

The ACS count processing unit 1004 corresponds to the Letter size standard-size printing medium. Further, in the copying apparatus 100 according to the present embodiment, for a plurality of standard-size printing medium, the ACS count processing units 1004, 1010, and 1016 corresponding to original document sizes such as Letter, A4, and B5, for example, are independently provided. Note that the ACS count processing units 1010 and 1016 have a similar configuration to that of the ACS count processing unit 1004, and thus a description thereof is omitted. Further, with respect to non-standard-size original documents whose original document sizes cannot be specified, each of the ACS count processing units independently obtains an ACS determination result, using the area restriction parameter thereof.

An adoption unit 1022 adopts one identification result from among the identification results obtained by the identification units 1009, 1015, and 1021 based on the original document size information calculated in S407, and outputs an ACS_NotHIT signal. The original document size information calculated in S407 is information calculated when the ACS_OFF instruction is issued (when the trailing edge of the original document passes the original document detection sensor 220). If the original document size information indicates a nonstandard size, the output paper size designated via the user interface 500 of the operation unit 150 is used as the original document size.

Figure 8:
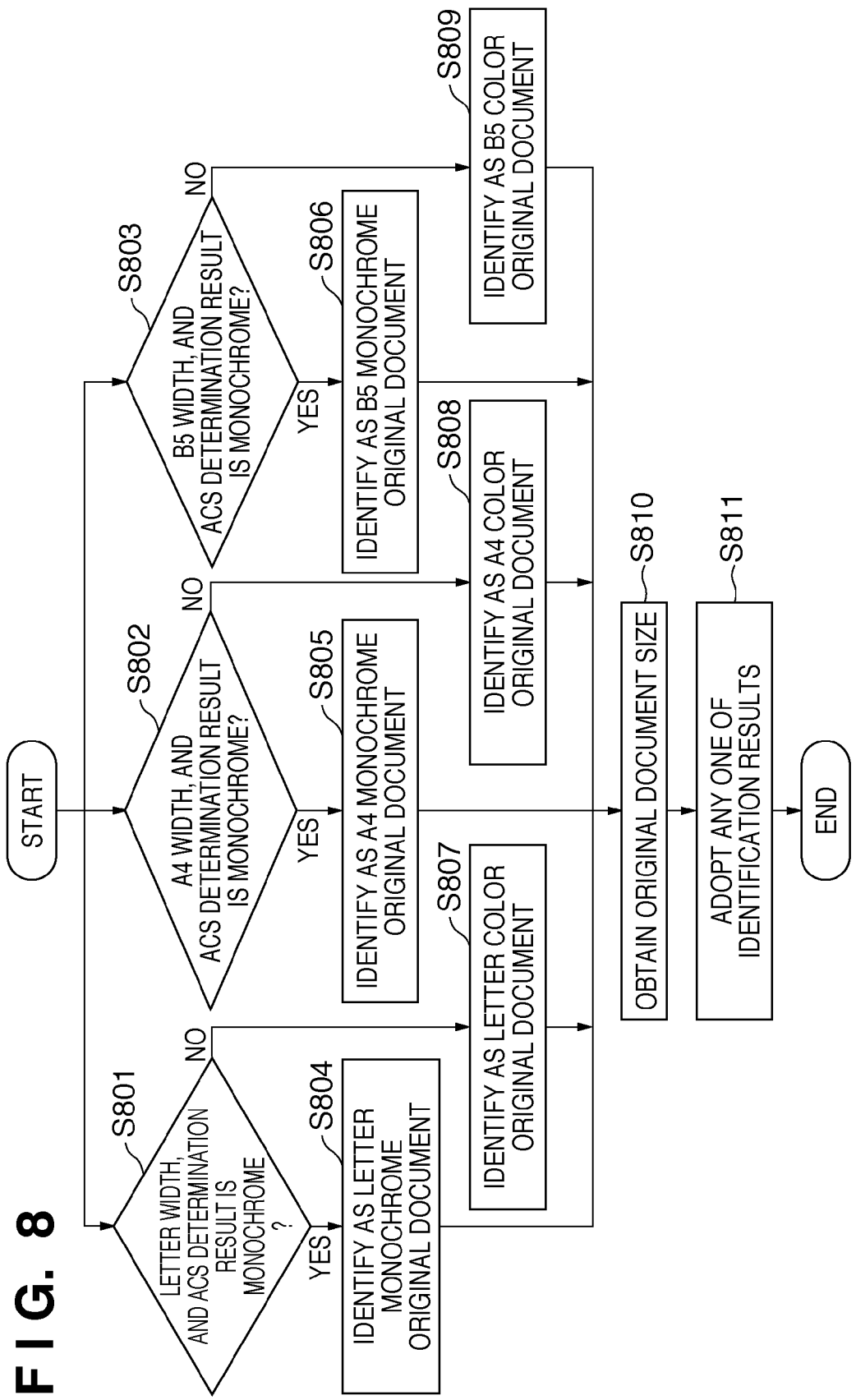
FIG. 8 is a flowchart showing a control procedure of an ACS count processing unit according to the embodiment of the present invention.

FIG. 8 is a flowchart showing a control procedure of the ACS count processing units according to the present embodiment. The processing in the flowchart described below starts upon receipt of the ACS_ON instruction outputted from the sensor control unit 222 in S402 in FIG. 4. Upon receipt of the ACS_ON instruction, the ACS count processing units 1004, 1010, and 1016 respectively execute processing in S801 to S809 in parallel in the areas restricted by the area restriction units 1001, 1002, and 1003. The ACS count processing units 1004, 1010, and 1016 perform determination in S801, S802, and S803 in parallel. Here, the ACS determination unit 103 starts ACS determination using the Letter width, the A4 width, and the B5 width performed by the ACS count processing units 1004, 1010, and 1016, and determines whether or not the original document is monochrome. When ACS determination is started, as described above, the main scanning count units 1007, 1013, and 1019, and the sub scanning count units 1008, 1014, and 1020 start counting, and thereafter continue counting until the ACS_OFF instruction is received. Upon receipt of the ACS_OFF instruction, the ACS determination unit 103 identifies whether the original document is color or monochrome using the identification units 1009, 1015, and 1021. After that, in S804 to S809, based on the identification results obtained by the identification units 1009, 1015, and 1021, the ACS determination unit 103 estimates whether the original document is a color original document or a monochrome original document for each of the ACS determinations using the Letter width, the A4 width, and the B5 width.

Next, in S810, the ACS determination unit 103 obtains original document size information from the sensor control unit 222. Subsequently, in S811, the adoption unit 1022 of the ACS determination unit 103 adopts the optimal identification result from among the plurality of original document types estimated in S804 to S809, based on the obtained original document size information. Here, for example, in the case where the original document size is specified as being a nonstandard size, the adoption unit 1022 adopts the identification result identified using a standard-size printing medium size similar to a paper size that has been set for printing in the case of the copy job. Here, although an example has been described in which the ACS count processing units and the ACS determination unit 103 perform the processing in FIG. 8, there is no limitation to this. A configuration may be adopted in which the CPU 120 performs the processing in FIG. 8 in accordance with a program stored in the ROM 140.

Furthermore, here, since the effective reading width of the reader unit 200 is set to 216 mm, the sizes of the standard-size printing medium that can be specified by determining the length in the sub scanning direction without determining the length in the main scanning direction are B5, Letter, and A4, and thus the above example has been described. In addition to this, in the case of an A5 size original document, it is possible to determine, by setting the longer side of the A5 original document in the main scanning direction, that the original document is an A5 size original document based, in the same manner, only on the length in the sub scanning direction, without determining the length in the main scanning direction. In this case, an area restriction unit for the A5 size, and an ACS count processing unit for the A5 size may further be provided. However, if the shorter side of the A5 original document is set in the main scanning direction, the length in the main scanning direction is not determined, and accordingly it is determined that the size of the original document is a nonstandard size.

JPEG Compression

Figure 9:
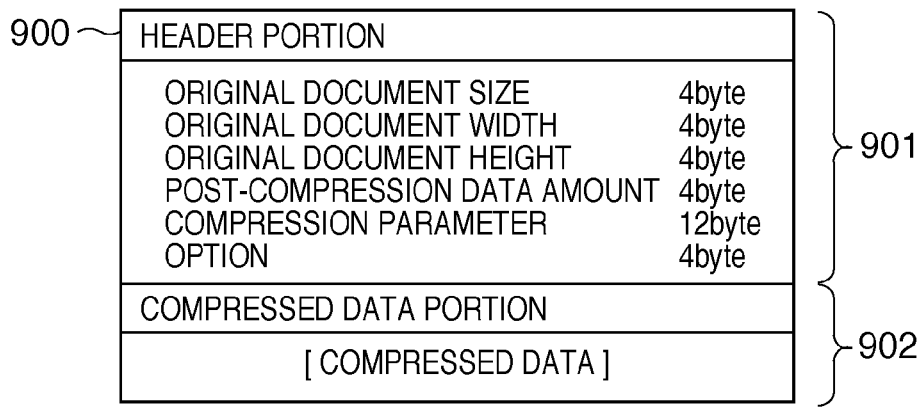
FIG. 9 is a diagram showing a data structure after JPEG compression according to the embodiment of the present invention.

Next, the structure of data generated by performing JPEG compression is described with reference to FIG. 9. FIG. 9 is a diagram showing the data structure after JPEG compression according to the present embodiment. Compressed data 900 is provided with a header portion 901, and a compressed data portion 902. The header portion 901 includes 4 bytes of original document size information, 4 bytes of image width information, 4 bytes of image height information, 4 bytes of post-compression data amount information, 12 bytes of compression parameter information, and 4 bytes of option parameter information. Thus, a total of 32 bytes of area is secured. The compressed data portion 902 includes actual compressed data.

In the image width and the image height, the numbers of pixels of the width and the length of the original document that is scanned are set, and are values decided uniquely by selecting a standard-size printing medium size, such as A4 or A3, for example. Of course, an arbitrary size can also be set via the user interface. In the post-compression data amount, the compressed data size at the point in time of the end of compression after the compression started is set. In the compression parameter, a compression table used at the time of compression, modes, such as a high compression mode and low compression mode, and a compression parameter are set. The option is a register in which an option parameter is set, and in the present embodiment, the result of the monochrome judgment flag (ACSNotHIT) is reflected therein.

Figure 10:
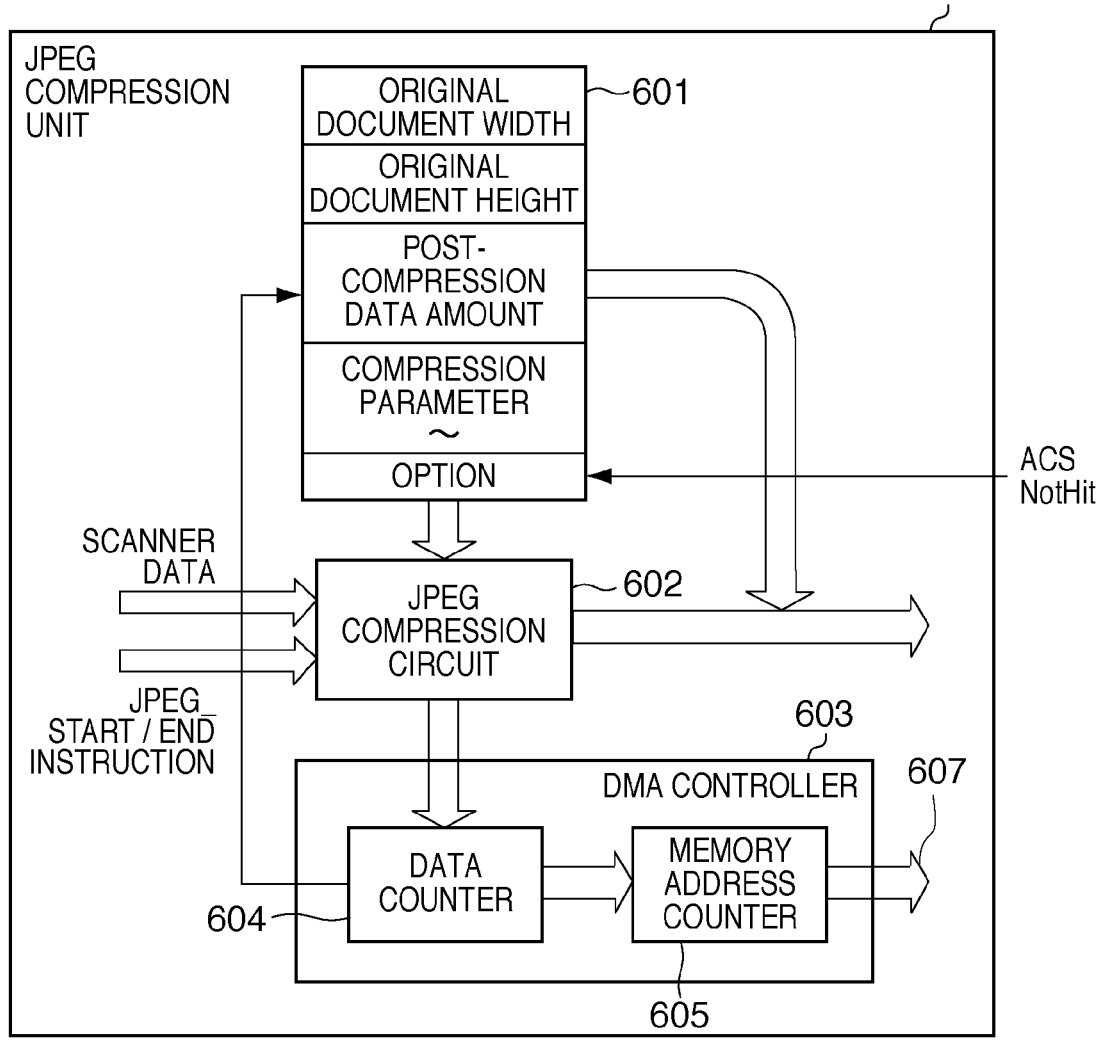
FIG. 10 is a block diagram showing an example of a configuration of a JPEG compression unit according to the embodiment of the present invention.

Next, the JPEG compression unit 102 is described with reference to FIG. 10. FIG. 10 is a block diagram showing an example of a configuration of the JPEG compression unit according to the present embodiment. Information in the header portion 901 shown in FIG. 9 is stored in a register 601, and when the information is added to compressed data, the information is transferred to a memory by a DMA controller 603 as header information, together with the compressed data. A JPEG compression circuit 602 performs JPEG compression on scanner data received from the reader unit 200 based on the compression parameter. The DMA controller 603 is provided with a data counter 604 and a memory address counter 605, and sequentially transfers compressed data to the address on an address bus 607 generated by the memory address counter 605. Further, the DMA controller 603 counts compressed data using the data counter 604, and sets the data amount in the post-compression data amount register of the register 601 after the end of compression.

If the original document image size, the image width, and the image height are set in advance by the user via the user interface 500, the CPU 120 sets the set values in the register 601. Also, at the same time, the CPU 120 sets a compression parameter as necessary. On the other hand, in the case where an original document is placed on the ADF unit 250, and the original document size is not known in advance, the CPU 120 sets the maximum image size at which scanning is possible. Furthermore, the CPU 120 sets 1 as the ACSNotHIT flag in the corresponding bit in the option register.

When scanning starts due to the button 501 of the operation unit 150 being pressed, in the case of the original document placed on the ADF unit 250, the sensor control unit 222 transmits the JPEG_START instruction as a command to the JPEG compression unit 102. Then, the JPEG compression unit 102 starts sequentially compressing image data pieces that are sequentially transferred, based on the compression parameter. At this time, the address in the memory 104 serving as a transfer destination memory indicates an address 32 bytes after the starting address of the storage destination memory that is set. Therefore, compressed image data pieces are sequentially stored from the address 32 bytes after the storage destination starting address that is set.

The sequential compression proceeds, and at the point in time when compression ends, that is, at the point in time when transferring the amount of input image data calculated from the image width and the image height ends, the DMA controller 603 sets the counter value counted by the data counter 604 in the post-compression data amount register. Alternatively, at the point in time when transmission of the compressed data and the JPEG_END instruction from the sensor control unit 222 ends, the DMA controller 603 sets the counter value counted by the data counter 604 in the post-compression data amount register. At the same time, the original document size information from the sensor control unit 222 is also set in the register 601.

Further, image data transferred from the reader unit 200 that sequentially reads original documents is also inputted to the ACS determination unit 103, and then it is sequentially determined whether the image data is a color image or a monochrome image. For example, if it is determined that the image that is being scanned is a color image, the ACSNotHIT signal is caused to be hit, and the result is reflected in the option register.

When transmission of the compressed data ends, the memory address counter 605 returns the address to the original transfer destination starting address, and transfers the content of the register 601 to the memory as a header portion. Therefore, data stored in the memory 104 is stored in the form in which the header portion 901 is stored first, and the compressed data portion 902 follows after that. Note that the data stored from the JPEG compression unit 102 corresponds to the JPEG file 105 shown in FIG. 1.

Figure 11:
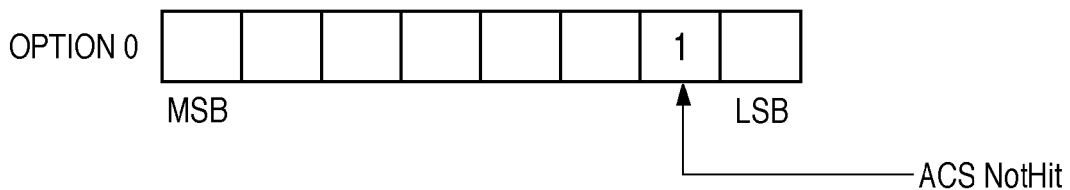
FIG. 11 is a diagram showing a least significant byte of an option register according to the embodiment of the present invention.

Here, the option register of the register 601 is described with reference to FIG. 11. FIG. 11 is a diagram showing the least significant byte of the option register according to the present embodiment. Hereinafter, the least significant byte of the option register is referred to as an option 0 register. As described above, in BIT1 of the option 0 register, 1 is set as the ACSNotHIT flag before an image is scanned. For example, if it is determined that the image that is being scanned is a color image, the ACSNotHIT signal is hit, and at that time, the ACSNotHIT flag in BIT1 of the option 0 register is reset. That is, by referencing the ACSNotHIT flag in BIT1 of the option 0 register, it is possible to determine whether the scanned data is a color image or a monochrome image.

Box Function

Next, a box function that makes use of the memory 104 is described. In the digital copier that pursues lower cost, in order to realize the BOX function, it is necessary to make the image storage memory capacity as small as possible, and for efficient memory usage, it is necessary to always compress a scanned image with the optimal image compression method before storing the compressed image.

The box function is a function for providing a temporary image storage space prepared for individuals in the copying apparatus 100. For example, the scanned image can be temporarily stored in the memory 104, and later transferred to a server connected via a network, or a corresponding file in the copying apparatus 100 can be accessed from a host computer. Further, the box function is a function that enables print output of a selected file without newly performing scanning.

Below is a description of a method for efficiently utilizing the resource of the memory 104 using ACSNotHIT in BIT1 of the option 0 register. When utilizing the box function, the user designates BOX via the user interface 500, and sequentially registers images from a scanner 101. The procedure is similar to the procedure for copying processing described above, according to which whether an image is a color image or a monochrome image is detected while sequentially performing JPEG compression, and the result is stored in the memory 104 together with the ACSNotHIT flag in BIT1 of the option 0 register. For example, if the ACSNotHIT flag is not set, the image on which JPEG compression has been performed is stored as the color image JPEG file 105, or if the ACSNotHIT flag is set, the image is stored as the monochrome image JPEG file 107.

However, if the monochrome image JPEG file 107 is stored as a JPEG compression file, the efficiency falls in terms of the efficient use of the memory 104. In view of this, in the present embodiment, the monochrome image JPEG file 107 is specified by sequentially searching the headers of the files in the memory 104, and the file is converted into a JBIG compressed file, which is optimal for a monochrome image, and thus the utilization efficiency of the memory 104 is improved. Note that the monochrome image JPEG file 107 is easily searched for by checking the set value of the ACSNotHIT flag.

JBIG Compression

Below is a description of a technique for converting from JPEG compression into JBIG compression. The CPU 120 reads out each monochrome image JPEG file 107 stored in the memory 104, and sequentially transfers the read files to the JPEG decompression unit 111, which then decompresses and reconstructs the files. The monochrome image reconstructed by the JPEG decompression unit 111 is converted into a monochrome binary image by the H.T processing unit 112 performing pseudo-tone conversion thereon, and thereafter the JBIG compression unit 110 performs JBIG compression on the binary image, and the resultant image is again stored in the memory 104 as the JBIG file 106. At that time, the JPEG file 107 that is the source image is erased from the memory 104. In this way, in the case of a monochrome image, the compression efficiency can thereby be improved by storing a monochrome image as the JBIG file 106, thus enabling the efficient use of the memory 104.

Figure 12:
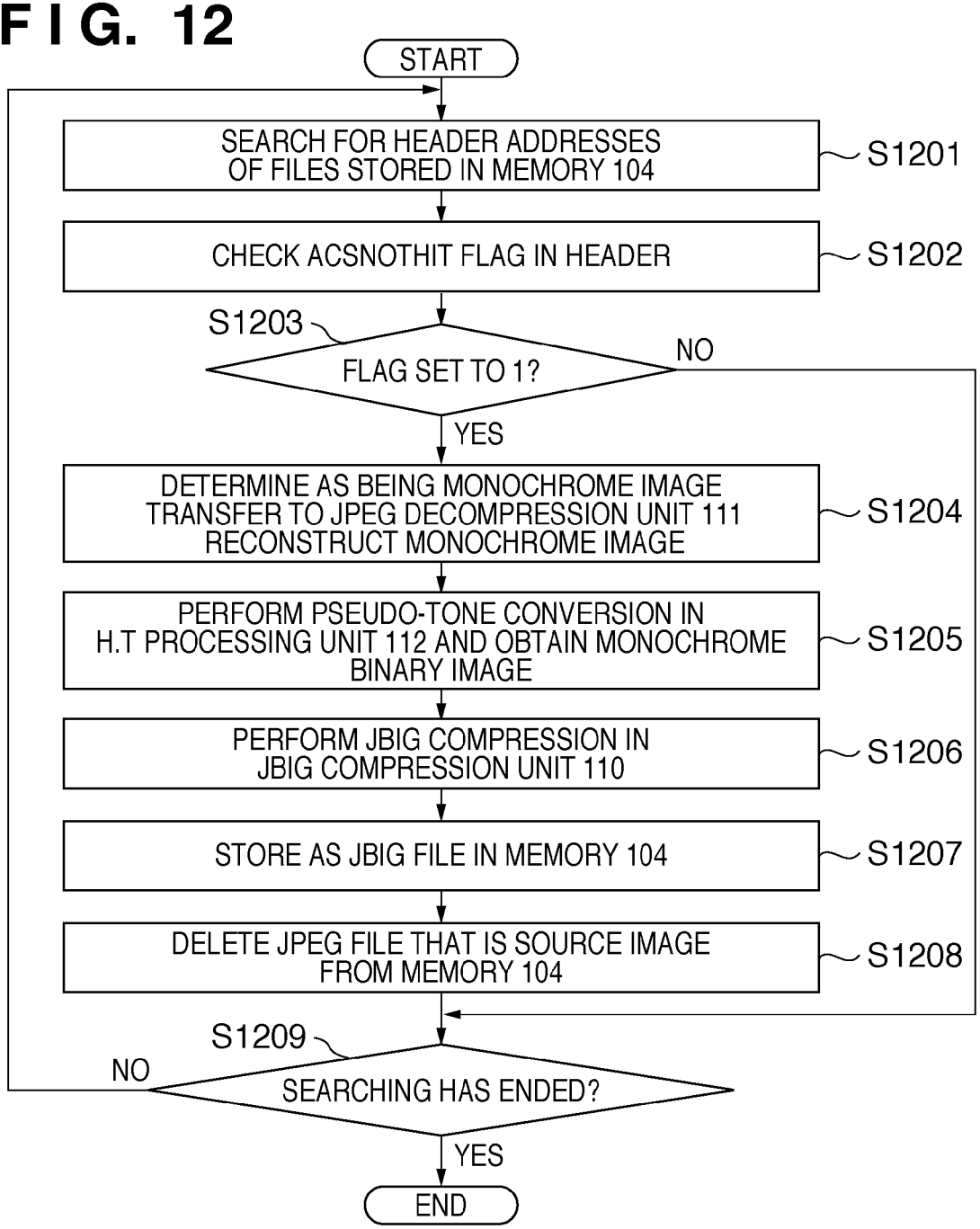
FIG. 12 is a flowchart showing a JBIG compression control procedure according to the embodiment of the present invention.

Next, control of processing for converting from a JPEG file to a JBIG file is described with reference to FIG. 12. FIG. 12 is a flowchart showing a JBIG compression control procedure according to the present embodiment. The CPU 120 performs overall control of the processing described below. First, in S1201, the CPU 120 searches for the header addresses of the files stored in the memory 104. Next, in S1202, the CPU 120 checks the ACSNotHIT flag in a header based on a found header address. Subsequently, in S1203, the CPU 120 determines whether or not the checked ACSNotHIT flag is set to 1. Here, if the flag is set to 1, it is determined that the file is a monochrome image, and the processing proceeds to S1204. On the other hand, if the flag has been reset, it is determined that the file is a color image, and the processing proceeds to S1209.

In S1204, the CPU 120 transfers image data determined as being a monochrome image to the JPEG decompression unit 111, reconstructs the monochrome image, and transfers the resultant image to the H.T processing unit 112. In S1205, the CPU 120 causes the H.T processing unit 112 to execute pseudo-tone conversion on the reconstructed monochrome image, thus obtaining a monochrome binary image.

In S1206, the CPU 120 causes the JBIG compression unit 110 to execute JBIG compression on the obtained binary image. In S1207, the CPU 120 sequentially stores the obtained JBIG compression image data pieces in the memory 104. Subsequently, in S1208, the CPU 120 deletes the JPEG file 107 that is the source image from the memory 104. After that, in S1209, the CPU 120 determines whether or not searching for all the files stored in the memory 104 has ended, and if it has ended, the processing ends, and if it has not ended, the processing returns to S1201 in order to search for the next file.

The above processing enables efficient use of the memory 104. When printing an image stored in the memory 104, the user selects a desired box via the user interface 500, selects a file that is displayed, and presses the start button.

In the case of performing print output using the box function, the JPEG decompression unit 108 performs decompression and reconstruction on the JPEG file 105, the H.T processing unit 113 performs pseudo-tone conversion and calibration on the resultant file, and thereafter a printer 114 performs print output. On the other hand, in the case of a JBIG file, the JBIG decompression unit 109 performs decompression and reconstruction on a monochrome binary image, and thereafter the printer 114 performs print output. As described above, in the present embodiment, the effective reading width of the reading sensor that the reader unit 200 has is set to 216 mm. Accordingly, using the method described above, it is possible to reliably identify Letter (8.5*11 inches (approximately 216*approximately 279 mm)), A4 (210*297 mm), and B5 (182*257 mm) original document sizes without performing identification using an original document width sensor.

As described above, the image processing apparatus according to the present embodiment specifies, when reading an original document, the size of the original document from the timings at which the leading edge and the trailing edge of the original document that is conveyed were detected, and the conveying speed of the original document. Furthermore, the image processing apparatus determines whether image data read from the original document is a color image or a monochrome image, for each size of a plurality of standard-size printing medium. Then, from among a plurality of determination results, the determination result obtained by performing determination using a standard-size printing medium size similar to the specified size of the original document is adopted. In this way, the image processing apparatus of the present invention can specify the size of an original document without the provision of an expensive sensor to detect the size of an original document, that is, the length in the conveying direction of the original document and the length in the orthogonal direction with respect to the conveying direction. Furthermore, the image processing apparatus of the present invention can obtain the optimal determination result from among the above determination results obtained using the standard-size printing medium sizes, the determination being performed in parallel to the specification of the size of an original document. Thereby, the image processing apparatus of the present invention can determine with favorable accuracy whether an original document is a color image or a monochrome image, using an inexpensive configuration.

Note that the present invention is not limited to the above embodiment, and can be modified in various ways. For example, in the case where the original document size is specified as being a nonstandard size, and furthermore the current original document reading processing is processing for executing copying processing, the printing paper size may be specified as the original document size, and the optimal determination result may be adopted. Thereby, even in the case where the original document size cannot be specified as being a standard-size printing medium size, it is possible to efficiently continue processing with minimum accuracy. Further, the image processing apparatus of the present invention may select the optimal image-compression technique based on the above determination result. Thereby, a small memory area can be used efficiently.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-122559 filed on May 20, 2009, which is hereby incorporated by reference herein in its entirety.

What is claimed is:

1. An image processing apparatus comprising:
    a reading unit configured to perform a reading process for reading an area including an image of an original document and for generating data;
    a first determination unit configured to determine whether the image of the original document is a color image or a monochrome image based on the generated data of a first area corresponding to a first size read in the reading process performed by the reading unit;
    a second determination unit configured to determine whether the image of the original document is a color image or a monochrome image based on the generated data of a second area corresponding to a second size read in the same reading process performed by the reading unit, the second size being different from the first size;
    a specification unit configured to specify a size of the original document after determining by the first determination unit and determining by the second determination unit; and
    an adopting unit configured to adopt, in a case where the size of the original document specified by the specifying unit is the first size, a first determination result which has been determined by the first determination unit without adopting a second determination result which has been determined by the second determination unit, and to adopt, in a case where the size of the original document specified by the specifying unit is the second size, the second determination result without adopting the first determination result.

2. The image processing apparatus according to claim 1, further comprising:
    a conveying unit configured to convey the original document; and
    a detection unit configured to detect a leading edge and a trailing edge of the original document conveyed by the conveying unit,
    wherein the specification unit specifies, from a length in a conveying direction calculated based on the timings at which the detection unit detected the leading edge and the trailing edge, the size of the original document.

3. The image processing apparatus according to claim 2, wherein the specification unit comprises a calculation unit that calculates the length in the conveying direction of the original document, from the timings at which the detection unit detected the leading edge and the trailing edge, and a conveying speed of the original document.

4. The image processing apparatus according to claim 1, wherein the first determination unit and the second determination unit determine whether the image of the original document read by the reading unit is a color image or a monochrome image in parallel.

5. The image processing apparatus according to claim 1, further comprising a compressing unit configured to perform JPEG compression on the image of the original document if the first determining unit or the second determining unit determines that the image of the original document is a color image, and to perform JBIG compression on the image of the original document if the first determining unit or the second determining unit determines that the image of the original document is a monochrome image.

6. A control method for an image processing apparatus which comprises a reading unit that performs a reading process for reading an area including an image of an original document and for generating data, the method comprising:
   determining, by a first determining unit, whether the image of the original document is a color image or a monochrome image based on the generated data of a first area corresponding to a first size read in the reading process performed by the reading unit;
   determining, by a second determining unit, whether the image of the original document is a color image or a monochrome image based on the generated data of a second area corresponding to a second size read in the same reading process performed by the reading unit, the second size being different from the first size;
   specifying a size of the original document after determining by the first determination unit and determining by the second determination unit; and
   adopting, in a case where the specified size of the original document is the first size, a first determination result which has been determined by the first determination unit without adopting a second determination result which has been determined by the second determination unit, and adopting, in a case where the specified size of the original document is the second size, the second determination result without adopting the first determination result.

7. A non-transitory computer-readable storage medium storing a computer program for causing a computer to execute the steps of the control method for the image processing apparatus according to claim 6.

* * * * *